(12) United States Patent
Inden et al.

(10) Patent No.: US 11,541,931 B2
(45) Date of Patent: Jan. 3, 2023

(54) CONTROL APPARATUS FOR MOTOR

(71) Applicant: JTEKT CORPORATION, Osaka (JP)

(72) Inventors: Yuki Inden, Okazaki (JP); Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 23 days.

(21) Appl. No.: 17/188,172

(22) Filed: Mar. 1, 2021

(65) Prior Publication Data

US 2021/0276617 A1 Sep. 9, 2021

(30) Foreign Application Priority Data

Mar. 9, 2020 (JP) .............................. JP2020-039938

(51) Int. Cl.
*B62D 6/04* (2006.01)

(52) U.S. Cl.
CPC ...................... *B62D 6/04* (2013.01)

(58) Field of Classification Search
CPC ........ B62D 6/04; B62D 5/0463; B62D 6/002; B62D 5/046; H02P 6/10; H02P 25/026; H02P 25/03; H02P 6/08
See application file for complete search history.

(56) References Cited

U.S. PATENT DOCUMENTS

| 6,122,040 | A | * | 9/2000 | Arita | ...................... | G01S 7/4972 |
| | | | | | | 356/5.1 |
| 2005/0035519 | A1 | * | 2/2005 | Ito | .......................... | B25J 9/1687 |
| | | | | | | 269/329 |
| 2018/0346021 | A1 | * | 12/2018 | Wang | .................... | B62D 5/0463 |
| 2019/0329818 | A1 | * | 10/2019 | Shoji | ...................... | B62D 6/002 |

FOREIGN PATENT DOCUMENTS

| EP | 3 210 853 A1 | 8/2017 | | |
| JP | 4872336 B2 | * 2/2012 | ............ | B41J 19/142 |
| JP | 2018-183046 A | 11/2018 | | |
| WO | WO-2019107437 A1 | * 6/2019 | ........... | B62D 15/025 |

OTHER PUBLICATIONS

English Translation of JP-4872336-B2, acquired from Espacenet May 18, 2022.*
English Machine Translation of WO-2019107437-A1, Accessed Oct. 4, 2022.*
Sep. 15, 2021 Extended European Search Report issued in European Patent Application No. 21160647.0.

* cited by examiner

*Primary Examiner* — Jeff A Burke
*Assistant Examiner* — Blake A Wood
(74) *Attorney, Agent, or Firm* — Oliff PLC

(57) ABSTRACT

A control apparatus for a motor includes an electronic control unit. The electronic control unit includes a first controller, a second controller, a third controller, and a fourth controller. The first controller is configured to, through execution of feedback control, compute a feedback control torque to be generated by the motor. The second controller is configured to compute a disturbance torque based on the feedback control torque and a predetermined angle. The third controller is configured to correct the feedback control torque by using the disturbance torque. The fourth controller is configured to compensate a transfer lag to the second controller between the feedback control torque and the predetermined angle.

2 Claims, 6 Drawing Sheets

CONTROL APPARATUS FOR MOTOR

CROSS-REFERENCE TO RELATED APPLICATION

This application claims priority to Japanese Patent Application No. 2020-039938 filed on Mar. 9, 2020, incorporated herein by reference in its entirety.

BACKGROUND

1. Technical Field

The disclosure relates to a control apparatus for a motor.

2. Description of Related Art

There is known a control apparatus that controls an electric power supplied to a motor used to control an autonomous driving system, a driving support system, or a steering system, such as a steer-by-wire system. For example, a control apparatus of Japanese Unexamined Patent Application Publication No. 2018-183046 (JP 2018-183046 A) computes a target motor torque (target automatic steering torque) based on a target turning angle set by a control apparatus for autonomous driving control, and computes a target motor current by dividing the computed target motor torque by a torque constant of a motor. The control apparatus for the motor feeds back a current supplied to the motor to bring a motor current detected through a current detection circuit into coincidence with the target motor current.

SUMMARY

The control apparatus of JP 2018-183046 A includes a disturbance observer. The disturbance observer estimates a disturbance torque based on a rotor rotation angle of the motor, detected through a rotational angle sensor, and the target motor torque computed based on the target turning angle. The control apparatus computes a target motor torque in consideration of the disturbance torque computed by the disturbance observer. Higher-accuracy motor control is achieved by compensating the disturbance torque.

However, the rotor rotation angle of the motor, detected through the rotational angle sensor, delays by a delay time of the rotational angle sensor or a dead time in a steering mechanism as compared to the target motor torque. A delay time is a time from when the rotational angle sensor detects a rotor rotation angle to when the rotational angle sensor fixes the rotor rotation angle as a sensor output. A dead time is, for example, a time during which there is no response even when an operation is performed on the motor. There are concerns about a decrease in the accuracy of calculating a disturbance torque due to a time difference between such two inputs to the disturbance observer.

The present disclosure increases the accuracy of calculating a disturbance torque.

An aspect of the disclosure provides a control apparatus for a motor. The motor turns a steered wheel of a vehicle. The control apparatus includes an electronic control unit. The electronic control unit includes a first controller, a second controller, a third controller, and a fourth controller. The first controller is configured to, through execution of feedback control, compute a feedback control torque to be generated by the motor. The feedback control is control to cause an angle convertible to a wheel steering angle of the steered wheel to follow a target angle. The second controller is configured to compute a disturbance torque based on a predetermined angle and the feedback control torque computed by the first controller. The predetermined angle is the angle convertible to the wheel steering angle and detected through a sensor. The disturbance torque is a torque that affects the angle convertible to the wheel steering angle, other than a torque to be generated by the motor. The third controller is configured to correct the feedback control torque computed by the first controller by using the disturbance torque computed by the second controller. The fourth controller is configured to compensate a transfer lag to the second controller between the predetermined angle and the feedback control torque computed by the first controller.

With the above configuration, the transfer lag to the second controller between the feedback control torque computed by the first controller and the angle convertible to the wheel steering angle and detected through the sensor is compensated. Therefore, the accuracy of calculating a disturbance torque by the second controller is further increased. In addition, a disturbance torque is further appropriately compensated, so the motor is highly accurately controlled.

In the control apparatus, the fourth controller may be configured to delay the feedback control torque computed by the first controller, by a delay of the predetermined angle relative to the feedback control torque computed by the first controller.

With the above configuration, a transfer lag to the second controller between the feedback control torque computed by the first controller and the angle convertible to the wheel steering angle and detected through the sensor is eliminated. Therefore, the accuracy of calculating a disturbance torque by the second controller is further increased.

In the control apparatus, the electronic control unit may further include a fifth controller configured to compute a feedforward control torque based on a second time derivative of the target angle. The third controller may be configured to subtract the disturbance torque from a value obtained by adding the feedforward control torque to the feedback control torque computed by the first controller.

With the above configuration, by using a feedforward control torque, the response of motor control is further increased as compared to a case where the motor is controlled without using a feedforward control torque.

With the above configurations, the accuracy of calculating a disturbance torque is further increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
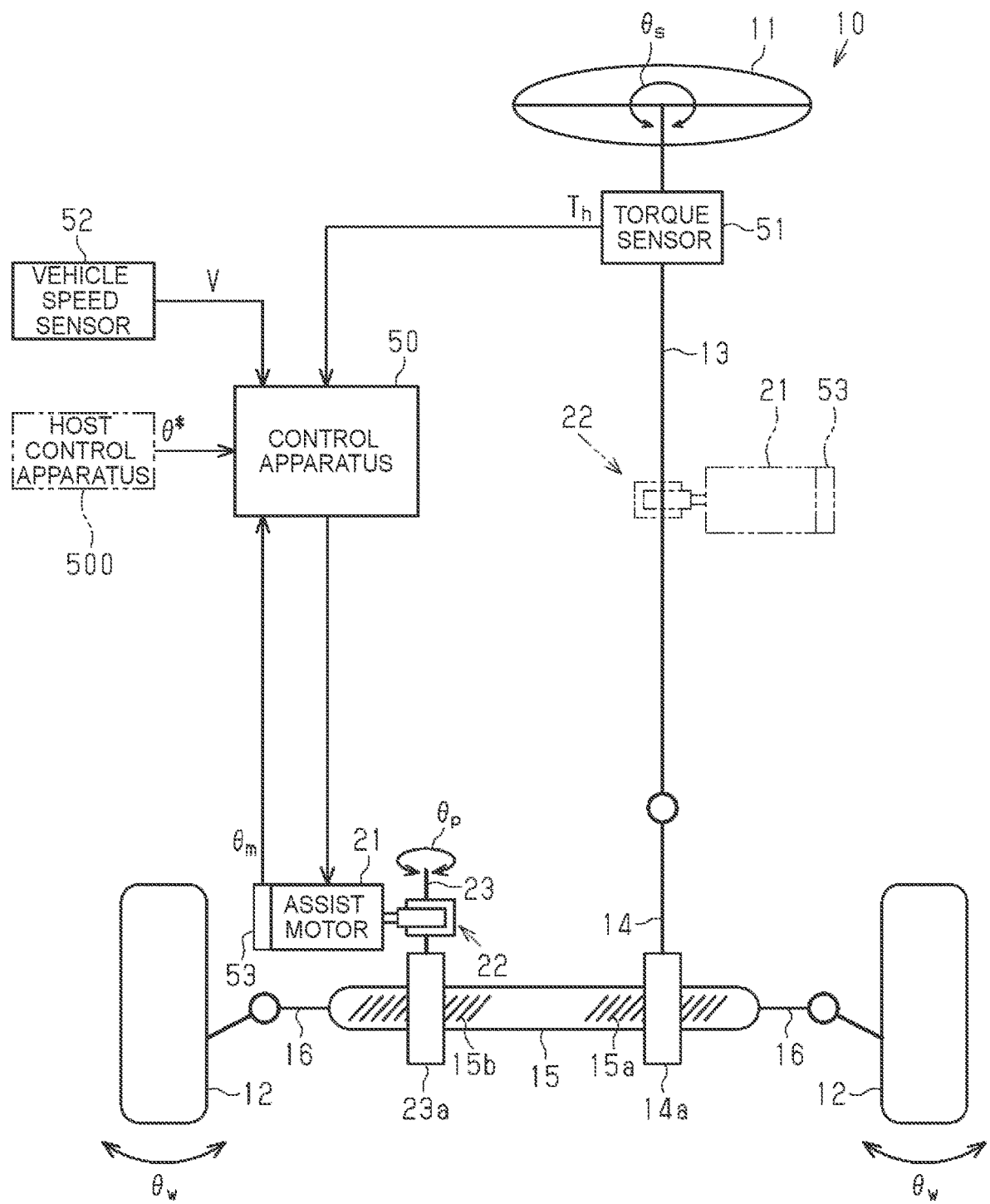
FIG. 1 is a configuration diagram of an electric power steering in which a control apparatus for a motor according to a first embodiment is installed.

Hereinafter, a first embodiment in which a control apparatus for a motor is implemented as a control apparatus of an electric power steering (EPS) will be described. As shown in FIG. 1, the EPS 10 includes a steering shaft, a pinion shaft 14, and a wheel steering shaft 15, as a power transmission path between a steering wheel 11 and a pair of steered wheels 12. The wheel steering shaft 15 extends along a vehicle width direction (right and left direction in FIG. 1). The steered wheels 12 are respectively coupled to both ends of the wheel steering shaft 15 via tie rods 16. The pinion shaft 14 is provided so as to intersect with the wheel steering shaft 15. Pinion teeth 14a of the pinion shaft 14 are meshed with rack teeth 15a of the wheel steering shaft 15. The wheel steering shaft 15 linearly moves with a rotating operation of the steering wheel 11. The linear motion of the wheel steering shaft 15 is transmitted to the right and left steered wheels 12 via the tie rods 16, with the result that a wheel steering angle $\theta_w$ of the steered wheels 12 is changed.

The EPS 10 includes a motor 21 and a speed reduction mechanism 22 as components to generate an assisting force that is a force to assist a driver in steering. The motor 21 functions as an assist motor that is a source to generate an assisting force. For example, a three-phase brushless motor is employed as the motor 21. The motor 21 is coupled to the pinion shaft 23 via the speed reduction mechanism 22. Pinion teeth 23a of the pinion shaft 23 are meshed with rack teeth 15a of the wheel steering shaft 15. Rotation of the motor 21 is reduced in speed by the speed reduction mechanism 22, and the rotating force reduced in speed is transmitted to the wheel steering shaft 15 via the pinion shaft 23 as an assisting force. The wheel steering shaft 15 moves along the vehicle width direction with rotation of the motor 21.

The EPS 10 includes a control apparatus 50. The control apparatus 50 controls the motor 21 based on results detected by various sensors. The sensors include a torque sensor 51, a vehicle speed sensor 52, and a rotational angle sensor 53. The torque sensor 51 detects a steering torque $T_h$ that acts on the steering shaft 13 through a rotating operation of the steering wheel 11. The vehicle speed sensor 52 detects a vehicle speed V. The rotational angle sensor 53 is provided in the motor 21. The rotational angle sensor 53 detects a rotation angle $\theta_m$ of the motor 21. The control apparatus 50 executes assist control to generate an assisting force according to a steering torque $T_h$ through energization control over the motor 21. The control apparatus 50 controls an electric power supplied to the motor 21, based on a steering torque $T_h$ detected through the torque sensor 51, a vehicle speed V detected through the vehicle speed sensor 52, and a rotation angle $\theta_m$ detected through the rotational angle sensor 53.

Figure 2:
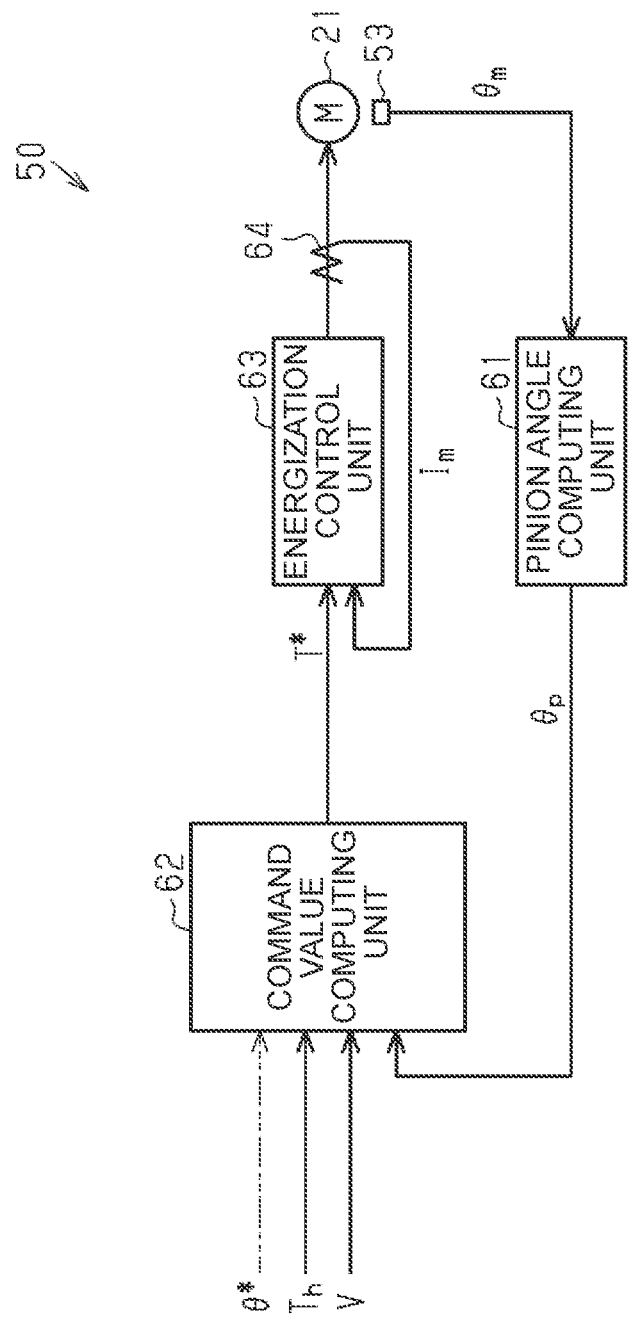
FIG. 2 is a control block diagram of the control apparatus for the motor according to the first embodiment.

Next, the control apparatus 50 will be described in detail. As shown in FIG. 2, the control apparatus 50 includes a pinion angle computing unit 61, a command value computing unit 62, and an energization control unit 63.

The pinion angle computing unit 61 computes a pinion angle $\theta_p$ based on a rotation angle $\theta_m$ of the motor 21, detected through the rotational angle sensor 53. The pinion angle $\theta_p$ is a rotation angle of the pinion shaft 23. The pinion angle computing unit 61 computes a pinion angle $\theta_p$ by, for example, dividing the rotation angle $\theta_m$ of the motor 21 by a speed reducing ratio of the speed reduction mechanism 22.

The pinion angle computing unit 61 may compute the rotation angle of the pinion shaft 14 as a pinion angle $\theta_p$. In this case, the pinion angle computing unit 61 computes a pinion angle $\theta_p$ that is the rotation angle of the pinion shaft 14 by, for example, dividing the rotation angle $\theta_m$ of the motor 21 by a speed reducing ratio of components from the motor 21 to the pinion shaft 14.

The command value computing unit 62 computes an assist command value T* based on a steering torque $T_h$ detected through the torque sensor 51 and a vehicle speed V detected through the vehicle speed sensor 52. The assist command value T* indicates an assist torque that is a rotating force to be generated by the motor 21. The command value computing unit 62 computes an assist command value T* having a greater absolute value as the absolute value of the steering torque $T_h$ increases or as the vehicle speed V decreases.

The energization control unit 63 supplies the motor 21 with an electric power according to the assist command value T*. Specifically, the energization control unit 63 is configured as follows. The energization control unit 63 computes a current command value based on the assist command value T*. The current command value is a target value of current to be supplied to the motor 21. The energization control unit 63 detects a current $I_m$ supplied to the motor 21, through a current sensor 64 provided in a power supply line to the motor 21. The energization control unit 63 finds a deviation between the current command value and the actual value of current $I_m$, and controls an electric power supplied to the motor 21 such that the deviation is minimized (feedback control over the current $I_m$). Thus, the motor 21 generates a torque according to the assist command value T*.

Figure 3:
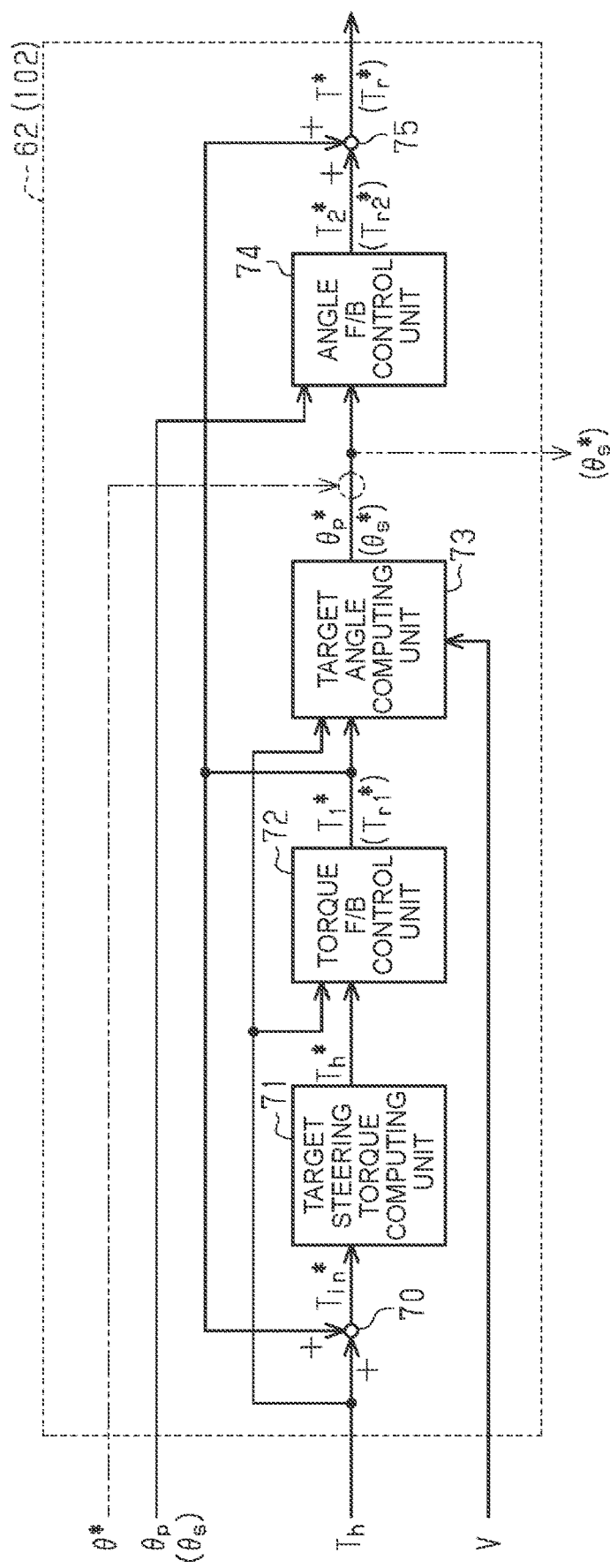
FIG. 3 is a control block diagram of a command value computing unit in the first embodiment.

Next, the command value computing unit 62 will be described in detail. As shown in FIG. 3, the command value computing unit 62 includes an adder 70, a target steering torque computing unit 71, a torque feedback control unit 72, a target angle computing unit 73, an angle feedback control unit 74, and an adder 75.

The adder 70 computes an input torque $T_{in}$* as a torque to be applied to the steering shaft 13, by adding a steering torque $T_h$ detected through the torque sensor 51 and a first assist torque $T_1$* computed by the torque feedback control unit 72.

The target steering torque computing unit 71 computes a target steering torque $T_h$* based on the input torque $T_{in}$* computed by the adder 70. The target steering torque $T_h$* is a target value of steering torque $T_h$ to be applied to the steering wheel 11. The target steering torque computing unit 71 computes a target steering torque $T_h$* having a greater absolute value as the absolute value of the input torque $T_{in}$* increases.

The torque feedback control unit 72 acquires the steering torque $T_h$ detected through the torque sensor 51 and the target steering torque $T_h$* computed by the target steering torque computing unit 71. The torque feedback control unit 72 computes a first assist torque $T_1$* by executing feedback control over the steering torque $T_h$ to cause the steering torque $T_h$ detected through the torque sensor 51 to follow the target steering torque $T_h$*.

The target angle computing unit 73 acquires the steering torque $T_h$ detected through the torque sensor 51, the first assist torque $T_1$* computed by the torque feedback control unit 72, and the vehicle speed V detected through the vehicle speed sensor 52. The target angle computing unit 73 computes a target pinion angle $\theta_p$ based on the acquired steering torque $T_h$, first assist torque $T_1^*$, and vehicle speed V. The target pinion angle $\theta_p^*$ is a target value of rotation angle of the pinion shaft 23.

The angle feedback control unit 74 acquires the target pinion angle $\theta_p^*$ computed by the target angle computing unit 73 and the actual pinion angle $\theta_p$ computed by the pinion angle computing unit 61. The angle feedback control unit 74 computes a second assist torque $T_2^*$ by executing feedback control over the pinion angle $\theta_p$ to cause the actual pinion angle $\theta_p$ to follow the target pinion angle $\theta_p^*$.

The adder 75 computes an assist command value T* by adding the first assist torque $T_1^*$ computed by the torque feedback control unit 72 and the second assist torque $T_2^*$ computed by the angle feedback control unit 74. When a current based on the assist command value T* is supplied to the motor 21, the motor 21 generates a torque according to the assist command value T*.

Figure 4:
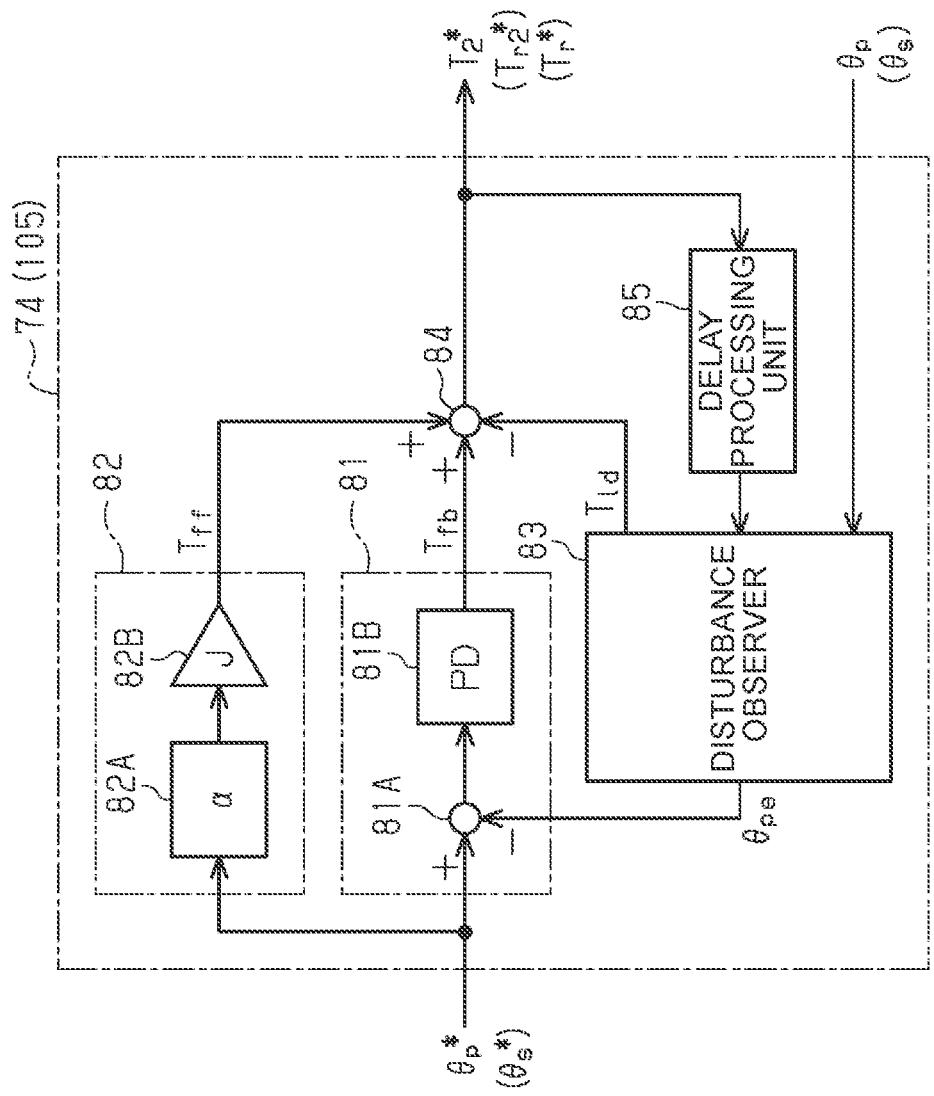
FIG. 4 is a control block diagram of a turning angle feedback control unit in the first embodiment.

Next, the angle feedback control unit 74 will be described in detail. As shown in FIG. 4, the angle feedback control unit 74 includes a feedback control unit 81, a feedforward control unit 82, a disturbance observer 83, and an adder 84.

The feedback control unit 81 is provided to bring a pinion angle estimated value $\theta_{pe}$ close to the target pinion angle $\theta_p^*$. The pinion angle estimated value $\theta_{pe}$ is an estimated value of pinion angle $\theta_p$, computed by the disturbance observer 83. The feedback control unit 81 includes a subtractor 81A and a PD control unit (proportional plus derivative control unit) 81B. The subtractor 81A computes a deviation $\Delta\theta_p$ ($=\theta_p^*-\theta_{pe}$) between the target pinion angle $\theta_p^*$ and a pinion angle estimated value $\theta_{pe}$ computed by the disturbance observer 83. The PD control unit 81B computes a feedback control torque $T_{fb}$ by performing proportional plus derivative operation on the deviation $\Delta\theta_p$ computed by the subtractor 81A. In other words, the feedback control torque $T_{fb}$ is the sum of an output value of a proportional control element and an output value of a derivative control element for an input of the deviation $\Delta\theta_p$.

The feedforward control unit 82 is provided to improve the response of control by compensating a delay of response due to the inertia of the EPS 10. The feedforward control unit 82 includes an angular acceleration computing unit 82A and a multiplication unit 82B. The angular acceleration computing unit 82A computes a target pinion acceleration $\alpha$ ($=d^2\theta_p^*/dt^2$) by evaluating the second derivative of the target pinion angle $\theta_p^*$. The multiplication unit 82B computes a feedforward control torque $T_{ff}(=J\cdot\alpha)$ as an inertia compensation value by multiplying an inertia J of the EPS 10 by the target pinion angular acceleration $\alpha$ computed by the angular acceleration computing unit 82A. The inertia J is found from, for example, the physical model of the EPS 10.

The disturbance observer 83 is provided to estimate and compensate a disturbance torque. A disturbance torque is a nonlinear torque that occurs as a disturbance in a plant (EPS 10) to be controlled, and is a torque that affects the pinion angle $\theta_p$, other than a torque to be generated by the motor 21. The disturbance observer 83 computes a disturbance torque estimated value $T_{ld}$ as a disturbance torque compensation value, and a pinion angle estimated value $\theta_{pe}$ based on a second assist torque $T_2^*$ and an actual pinion angle $\theta_p$. The second assist torque $T_2^*$ is a target value of the plant. The actual pinion angle $\theta_p$ is an output of the plant. The disturbance observer 83 may be configured to compute a disturbance torque estimated value $T_{ld}$ and a pinion angle estimated value $\theta_{pe}$ by using an assist command value T* instead of the second assist torque $T_2^*$.

The adder 84 computes a second assist torque $T_2^*$ ($=T_{fb}+T_{ff}-T_{ld}$) by subtracting the disturbance torque estimated value $T_{ld}$ from a value obtained by adding the feedforward control torque $T_{ff}$ to the feedback control torque $T_{fb}$. Thus, the second assist torque $T_2^*$ for which the inertia and the disturbance torque are compensated is obtained. An assist command value T* based on the second assist torque $T_2^*$ is used, so further higher-accuracy motor control is executed.

A pinion angle $\theta_p$ is computed based on the rotation angle $\theta_m$ of the motor 21, detected through the rotational angle sensor 53. For this reason, a pinion angle $\theta_p$ may delay by a delay time of the rotational angle sensor 53 or a dead time in the EPS 10, as compared to an assist command value T*. A delay time of the rotational angle sensor 53 is a time from when the rotational angle sensor 53 detects a rotation angle $\theta_m$ to when the rotational angle sensor 53 fixes the rotation angle $\theta_m$ as a sensor output. A dead time in the EPS 10 is a time during which there is no response even when an operation is performed on the motor 21. Then, there are concerns about a decrease in the accuracy of calculating a disturbance torque estimated value $T_{ld}$ due to a time difference between two inputs to the disturbance observer 83, that is, an assist command value T* and a pinion angle $\theta_p$.

In the present embodiment, the angle feedback control unit 74 includes a delay processing unit 85. The delay processing unit 85 is provided to minimize a time difference between two inputs to the disturbance observer 83. The delay processing unit 85 delays a second assist torque $T_2^*$ by a determined delay time. The second assist torque $T_2^*$ is one of two inputs to the disturbance observer 83. A set time is set based on a dead time of the plant and a delay time of the rotational angle sensor 53. More specifically, how long the pinion angle $\theta_p$ delays relative to the second assist torque $T_2^*$ is measured by simulation, and a delay time of the second assist torque $T_2^*$ is set with respect to the measured time.

When, for example, the pinion angle $\theta_p$ delays by one calculation cycle of the second assist torque $T_2^*$, the delay processing unit 85 delays the second assist torque $T_2^*$ by the one calculation cycle of the second assist torque $T_2^*$. The delay processing unit 85 acquires the second assist torque $T_2^*$ computed by the adder 84, and holds the acquired second assist torque $T_2^*$. The adder 84 computes a second assist torque $T_2^*$ at a predetermined calculation cycle. A second assist torque $T_2^*$ held in the delay processing unit 85 is updated each time a second assist torque $T_2^*$ is computed by the adder 84. In other words, a second assist torque $T_2^*$ held in the delay processing unit 85 is a last value (second assist torque $T_2^*$ one cycle before) for a second assist torque $T_2^*$. The second assist torque $T_2^*$ is a current value computed by the adder 84.

In this way, by delaying a second assist torque $T_2^*$ by a time a pinion angle $\theta_p$ delays relative to the second assist torque $T_2^*$, a time lag between the pinion angle $\theta_p$ and the second assist torque $T_2^*$, input to the disturbance observer 83, is eliminated.

Advantageous Effects of First Embodiment

According to the first embodiment, the following advantageous effects are obtained. (1) A transfer lag that is a time lag between a pinion angle $\theta_p$ and a second assist torque $T_2^*$, input, to the disturbance observer 83, is eliminated. Therefore, the accuracy of calculating a disturbance torque by the disturbance observer 83 is further increased. In addition, a disturbance torque is further appropriately compensated, so the motor 21 is highly accurately controlled.

Second Embodiment

Next, a second embodiment in which a control apparatus for a motor is applied to a steer-by-wire steering apparatus will be described. Like reference signs denote the same members and components to those of the first embodiment, and the detailed description thereof is omitted.

Figure 5:
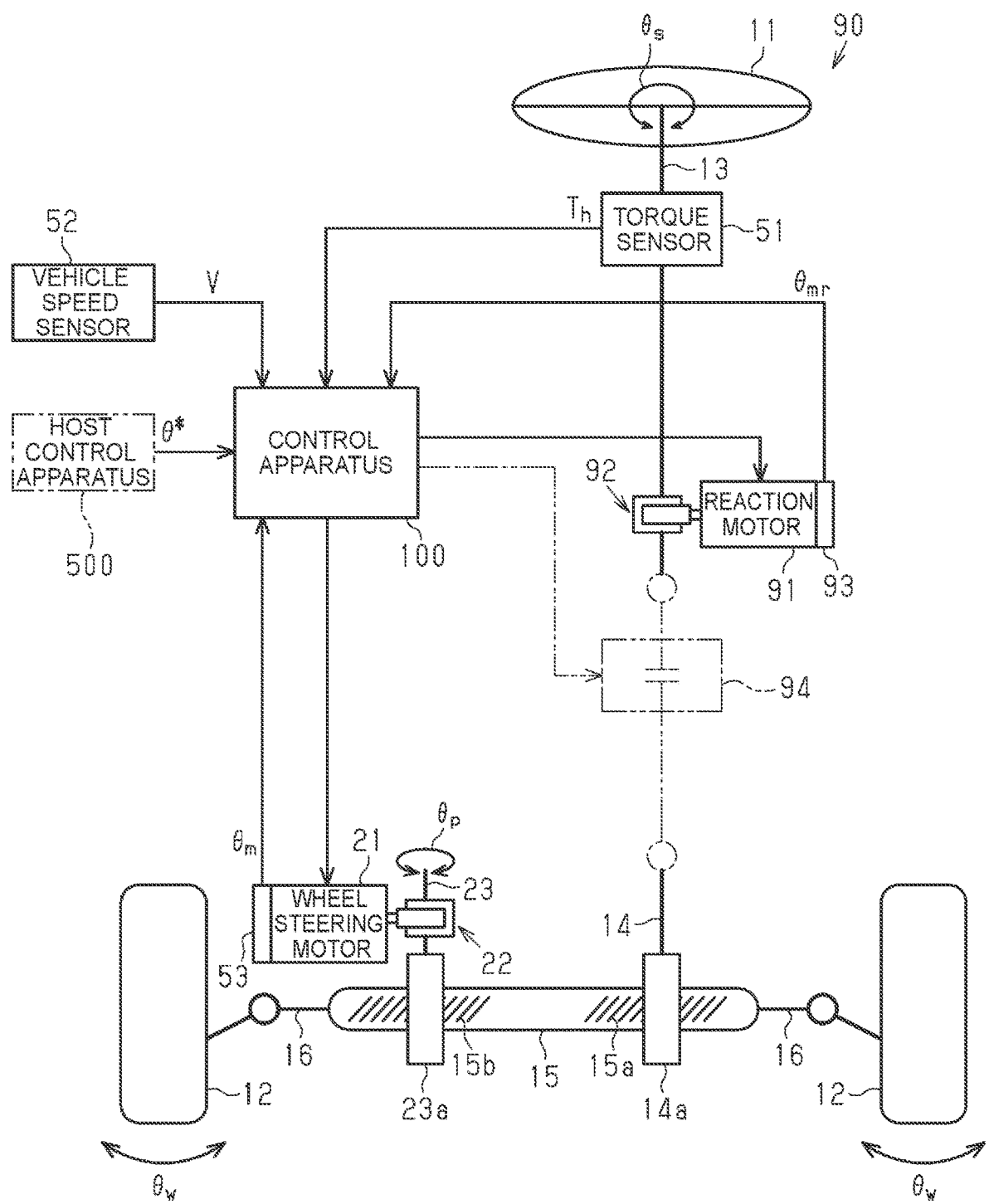
FIG. 5 is a configuration diagram of a steer-by-wire steering apparatus in which a control apparatus for a motor according to a second embodiment is installed.

As shown in FIG. 5, in a steering apparatus 90 for a vehicle, the steering shaft 13 and the pinion shaft 14 are mechanically separated. The steering apparatus 90 includes a reaction motor 91 and a speed reduction mechanism 92 as components for generating a steering reaction force. A steering reaction force is a force that acts in a direction opposite from a direction in which a driver operates the steering wheel 11. By applying a steering reaction force to the steering wheel 11, an adequate resistance feel can be provided to the driver.

The reaction motor 91 is a source to generate a steering reaction force. For example, a three-phase brushless motor is employed as the reaction motor 91. A rotary shaft of the reaction motor 91 is coupled to the steering shaft 13 via the speed reduction mechanism 92. The torque of the reaction motor 91 is applied to the steering shaft 13 as a steering reaction force. A rotational angle sensor 93 is provided in the reaction motor 91. The rotational angle sensor 93 detects a rotation angle $\theta_{mr}$ of the reaction motor 91.

The torque sensor 51 is provided at a portion of the steering shaft 13 between the speed reduction mechanism 92 and the steering wheel 11. The motor 21 functions as a wheel steering motor that is a source to generate a wheel steering force. A wheel steering force is a driving force to turn the steered wheels 12.

Figure 6:
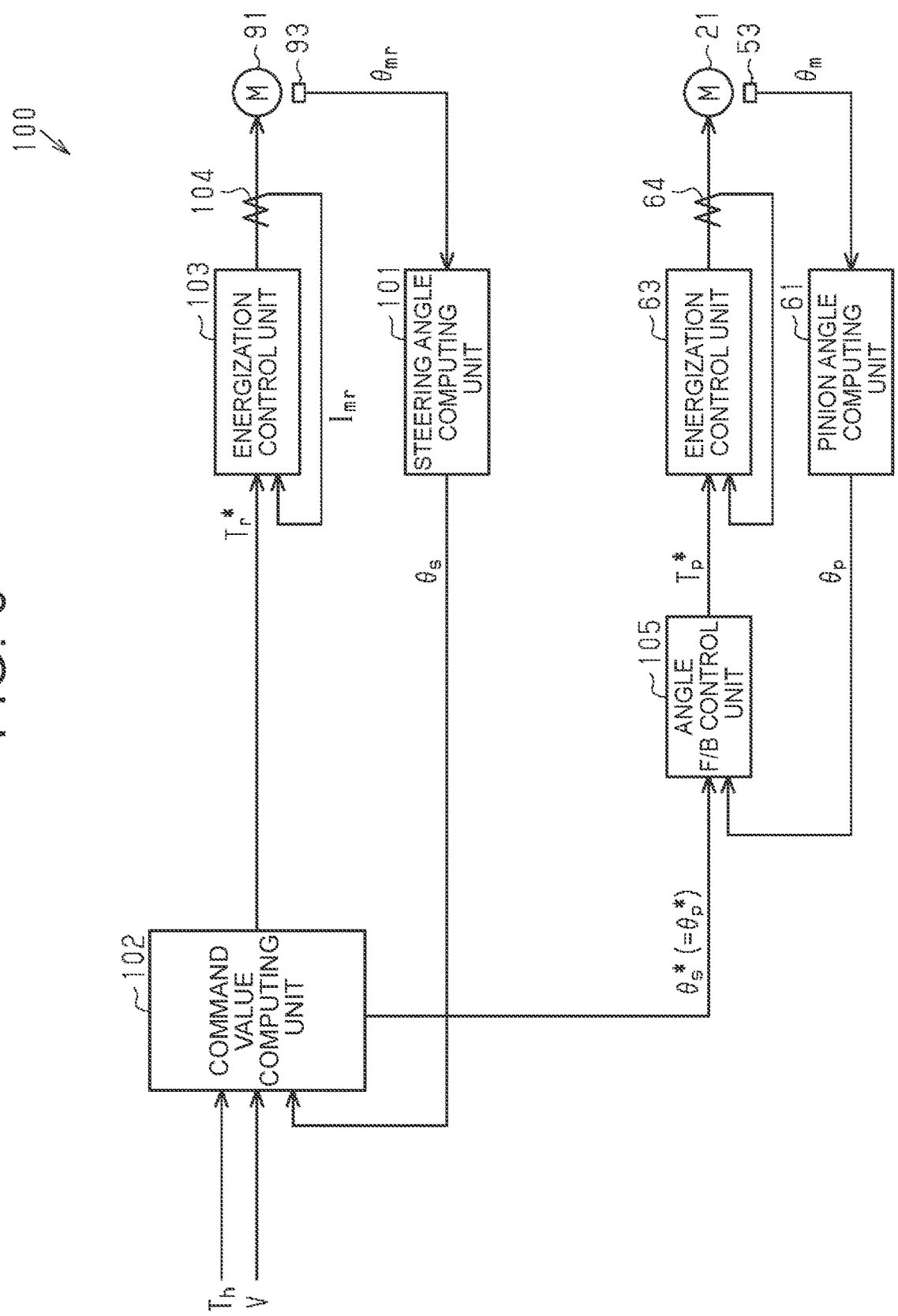
FIG. 6 is a control block diagram of the control apparatus for the motor according to the second embodiment.

Next, a control apparatus 100 of the steering apparatus 90 will be described in detail. As shown in FIG. 6, the control apparatus 100 includes a steering angle computing unit 101, a command value computing unit 102, and an energization control unit 103.

The steering angle computing unit 101 computes a steering angle $\theta_s$ based on the rotation angle $\theta_{mr}$ of the reaction motor 91, detected through the rotational angle sensor 93. The steering angle $\theta_s$ is a rotation angle of the steering wheel 11. The command value computing unit 102 computes a steering reaction force command value $T_r^*$ based on the steering torque $T_h$, the vehicle speed V, and the steering angle $\theta_s$. The command value computing unit 102 computes a steering reaction force command value $T_r^*$ having a greater absolute value as the absolute value of the steering torque $T_h$ increases or as the vehicle speed V decreases. The command value computing unit 102 computes a target steering angle $\theta_s^*$ of the steering wheel 11 in process of computing a steering reaction force command value $T_r^*$.

The energization control unit 103 supplies the reaction motor 91 with an electric power according to the steering reaction force command value $T_r^*$. Specifically, the energization control unit 103 computes a current command value for the reaction motor 91 based on the steering reaction force command value $T_r^*$. The energization control unit 103 detects a current $I_{mr}$ in a power supply line for the reaction motor 91 with the use of a current sensor 104 provided in the power supply line. The energization control unit 103 finds a deviation between the current command value and the actual value of current $I_{mr}$, and controls an electric power supplied to the reaction motor 91 such that the deviation is minimized. Thus, the reaction motor 91 generates a torque according to the steering reaction force command value $T_r^*$.

The control apparatus 100 includes an angle feedback control unit 105 in addition to the pinion angle computing unit 61 and the energization control unit 63. The angle feedback control unit 105 has processing functions similar to those of the angle feedback control unit 74 of the first embodiment, described with reference to FIG. 4. The angle feedback control unit 105 acquires the target steering angle $\theta_s^*$ computed by the command value computing unit 102, as a target pinion angle $\theta_p^*$. The angle feedback control unit 105 acquires the pinion angle $\theta_p$ computed by the pinion angle computing unit 61. The angle feedback control unit 105 computes a pinion angle command value $T_p^*$ through feedback control over the pinion angle $\theta_p$ to cause an actual pinion angle $\theta_p$ to follow the target pinion angle $\theta_p^*$ (Here, equal to the target steering angle $\theta_s^*$). The energization control unit 63 supplies the wheel steering motor 21 with an electric power according to the pinion angle command value Tp*. Thus, the wheel steering motor 21 rotates by an angle according to the pinion angle command value $T_p^*$.

Next, the command value computing unit 102 will be described in detail. As shown by reference signs with parentheses in FIG. 3, the command value computing unit 102 basically has processing functions similar to the command value computing unit 62 of the first embodiment. However, the command value computing unit 102 differs from the command value computing unit 62 of the first embodiment in the following points.

The torque feedback control unit 72 acquires the steering torque $T_h$ detected through the torque sensor 51 and the target steering torque $T_h^*$ computed by the target steering torque computing unit 71. The torque feedback control unit 72 computes a first steering reaction force command value $T_{r1}^*$ through feedback control over a steering torque $T_h$ to cause the steering torque $T_h$ to follow the target steering torque $T_h^*$.

The target angle computing unit 73 acquires the steering torque $T_h$ detected through the torque sensor 51, the first steering reaction force command value $T_{r1}^*$ computed by the torque feedback control unit 72, and the vehicle speed V detected through the vehicle speed sensor 52. The target angle computing unit 73 computes a target steering angle $\theta_s^*$ of the steering wheel 11 based on the steering torque $T_h$, the first steering reaction force command value $T_{r1}^*$, and the vehicle speed V.

The angle feedback control unit 74 acquires the steering angle $\theta_s$ computed by the steering angle computing unit 101, and the target steering angle $\theta_s^*$ computed by the target angle computing unit 73. The angle feedback control unit 74 computes a second steering reaction force command value $T_{r2}^*$ through feedback control over a steering angle $\theta_s$ computed by the steering angle computing unit 101 to cause the steering angle $\theta_s$ to follow the target steering angle $\theta_s^*$.

The adder 75 computes a steering reaction force command value $T_r^*$ by adding the first steering reaction force command value $T_{r1}^*$ computed by the torque feedback control unit 72 and the second steering reaction force command value $T_{r2}^*$ computed by the angle feedback control unit 74.

Advantageous Effects of Second Embodiment

According to the second embodiment, the following advantageous effects are obtained. (2) A transfer lag that is a time lag between a steering angle $\theta_s$ and a second steering reaction force command value $T_{r2}^*$, input to the disturbance observer 83 of the angle feedback control unit 74, is eliminated. A time lag between a pinion angle $\theta_p$ and a second steering reaction force command value $T_{r2}^*$, input to the disturbance observer 83 of the angle feedback control unit 105, is eliminated. Therefore, the accuracy of calculating a disturbance torque by the disturbance observer 83 is further increased. In addition, a disturbance torque is further appropriately compensated, so the reaction motor 91 and the motor 21 serving as a wheel steering motor are further highly accurately controlled.

Other Embodiments

The first and second embodiments may be modified as follows. In the first embodiment, the example in which the control apparatus 50 is applied to the EPS 10 that applies an assisting force to the wheel steering shaft 15 is described. Alternatively, the control apparatus 50 may be applied to an EPS that applies an assisting force to the steering shaft 13. As represented by the alternate long and two-short dashed line in FIG. 1, the motor 21 is, for example, coupled to the steering shaft 13 via the speed reduction mechanism 22. The pinion shaft 23 may be omitted.

In the second embodiment, a clutch may be provided in the steering apparatus 90. In this case, as represented by the alternate long and two-short dashed line in FIG. 5, the steering shaft 13 and the pinion shaft 14 are coupled via a clutch 94. An electromagnetic clutch that provides or interrupts power by supplying or interrupting a current to an exciting coil is employed as the clutch 94. The control apparatus 100 performs engage/disengage control for engaging or disengaging the clutch 94. When the clutch 94 is disengaged, power transmission between the steering wheel 11 and each of the steered wheels 12 is mechanically interrupted. When the clutch 94 is engaged, power transmission between the steering wheel 11 and each of the steered wheels 12 is mechanically allowed.

In the first and second embodiments, when the disturbance observer 83 uses integral operation in computing a pinion angle estimated value $\theta_{pe}$, the disturbance estimation performance of the disturbance observer 83 may decrease due to a discretization error in a high frequency range. In this case, a bilinear transformation relation may be used for discrete integral operation.

A vehicle may be equipped with an autonomous driving system that implements various driving support functions for further improving safety or convenience of the vehicle or automated driving functions with which the system replaces driving operation. In this case, as represented by the alternate long and two-short dashed line in FIG. 1 and FIG. 5, the vehicle is equipped with a host control apparatus 500 that generally controls control apparatuses of various onboard systems. The host control apparatus 500 determines an optimal control method based on the status of the vehicle at any given time, and individually instructs various onboard control apparatuses to execute control in accordance with the determined control method.

The host control apparatus 500 intervenes in steering control that is executed by the control apparatus 50 or the control apparatus 100. The host control apparatus 500, for example, computes an additional angle command value as a command value $\theta^*$ for causing the vehicle to travel in a target lane. The additional angle command value is a target value of pinion angle $\theta_p$ or steering angle $\theta_s$ (an angle to be added to the current pinion angle $\theta_p$ or steering angle $\theta_s$) required to cause the vehicle to travel along a lane for a travel status of the vehicle at any given time. As represented by the alternate long and two-short dashed line in FIG. 3, the command value $\theta^*$ is added to a target pinion angle $\theta_p^*$ or target steering angle $\theta_s^*$ computed by the target angle computing unit 73.

In the first and second embodiments, the angle feedback control unit 74 or the angle feedback control unit 105 that includes no feedforward control unit 82 may be employed.

Other Technical Idea

Next, a technical idea that can be obtained from the first and second embodiments will be described below. The motor is an assist motor, a wheel steering motor, or a reaction motor. The assist motor is a source to generate an assisting force. The wheel steering motor is a source to generate a wheel steering force. The reaction motor is a source to generate a steering reaction force.

What is claimed is:

1. A control apparatus for a motor used to turn a steered wheel of a vehicle, the control apparatus comprising an electronic control unit, wherein:

the electronic control unit includes a first controller, a second controller, a third controller, and a fourth controller;

the first controller is configured to, through execution of feedback control, compute a feedback control torque to be generated by the motor, the feedback control is control to cause an angle convertible to a wheel steering angle of the steered wheel to follow a target angle;

the second controller is configured to compute a disturbance torque based on a predetermined angle and the feedback control torque computed by the first controller, the predetermined angle is the angle convertible to the wheel steering angle and detected through a rotational angle sensor provided in the motor, the disturbance torque is a torque that affects the angle convertible to the wheel steering angle, other than a torque to be generated by the motor;

the third controller is configured to correct the feedback control torque computed by the first controller by using the disturbance torque computed by the second controller;

the fourth controller is configured to compensate a transfer lag to the second controller between the predetermined angle and the feedback control torque computed by the first controller;

the fourth controller is configured to delay the feedback control torque computed by the first controller, by a delay of the predetermined angle relative to the feedback control torque computed by the first controller, and the electronic control unit controls the motor to operate according to the feedback control torque.

2. The control apparatus according to claim 1, wherein:

the electronic control unit further includes a fifth controller configured to compute a feedforward control torque based on a second time derivative of the target angle; and the third controller is configured to subtract the disturbance torque from a value obtained by adding the feedforward control torque to the feedback control torque computed by the first controller.

\* \* \* \* \*